United States Patent
Lee et al.

(10) Patent No.: US 8,973,152 B2
(45) Date of Patent: Mar. 3, 2015

(54) APPARATUS AND METHOD FOR GUARANTEEING INTEGRITY OF REAL-TIME VEHICLE DATA AND VEHICLE BLACK BOX SYSTEM USING THE SAME

(75) Inventors: Dong-Hoon Lee, Seoul (KR); Yun-Gyu Kim, Yongin-si (KR); Bum-Han Kim, Seoul (KR)

(73) Assignee: Anastasis Co., Ltd, Seoul (KR)

( * ) Notice: Subject to any disclaimer, the term of this patent is extended or adjusted under 35 U.S.C. 154(b) by 0 days.

(21) Appl. No.: 13/393,064

(22) PCT Filed: Mar. 30, 2010

(86) PCT No.: PCT/KR2010/005844
§ 371 (c)(1),
(2), (4) Date: May 14, 2012

(87) PCT Pub. No.: WO2011/025331
PCT Pub. Date: Mar. 3, 2011

(65) Prior Publication Data
US 2012/0222130 A1 Aug. 30, 2012

(30) Foreign Application Priority Data
Aug. 31, 2009 (KR) .................. 10-2009-0081278

(51) Int. Cl.
*H04L 29/06* (2006.01)
*G07C 5/08* (2006.01)
*H04L 9/32* (2006.01)

(52) U.S. Cl.
CPC .............. *G07C 5/085* (2013.01); *H04L 9/321* (2013.01); *H04L 9/3236* (2013.01); *G07C 5/0858* (2013.01); *H04L 2209/84* (2013.01)
USPC ............... 726/27; 726/30; 713/176; 713/189; 713/190; 380/37; 701/32.2

(58) Field of Classification Search
USPC .............................................. 380/37; 726/27
See application file for complete search history.

(56) References Cited

U.S. PATENT DOCUMENTS

| | | | |
|---|---|---|---|
| 6,157,317 A | 12/2000 | Walker | |
| 6,959,384 B1* | 10/2005 | Serret-Avila | 713/176 |
| 7,167,988 B2 | 1/2007 | Hayashi | |
| 2001/0005804 A1* | 6/2001 | Rayner | 701/35 |
| 2003/0084298 A1* | 5/2003 | Messerges et al. | 713/176 |
| 2005/0188216 A1* | 8/2005 | Crispin et al. | 713/190 |
| 2008/0022128 A1* | 1/2008 | Proudler et al. | 713/189 |
| 2008/0028224 A1 | 1/2008 | Pitsos | |
| 2009/0193211 A1* | 7/2009 | Hu et al. | 711/163 |

FOREIGN PATENT DOCUMENTS

| | | |
|---|---|---|
| JP | 2005-027059 A | 1/2005 |
| KR | 10-2005-0064343 A | 6/2005 |

OTHER PUBLICATIONS

Jin-xin et al., "A Hybrid and Efficient Scheme of Multicast Source Authentication", 2007, pp. 123-125.*

* cited by examiner

*Primary Examiner* — David Pearson
*Assistant Examiner* — Thaddeus Plecha
(74) *Attorney, Agent, or Firm* — Dickinson Wright PLLC (57) ABSTRACT

A vehicle black box technique guarantees the integrity of vehicle data stored in a black box in real time by forming input data streams as block data and performing a signature using a signing key and nested hashing. Each vehicle black box includes a reliable unique signing key supporting a non-repudiation function. An error correction function is provided by a unique algorithm for generating integrity verification data even when an error occurs from the vehicle data.

15 Claims, 4 Drawing Sheets

$IAD = Sign_{sk}(BD_1)$

| BLOCK DATA($BD_n$) | FIRST HASH VALUE($h_n$) | SECOND HASH VALUE($h_n'$) | INTEGRITY VERIFICATION DATA($AD_n$) |
|---|---|---|---|
| $BD_1$ | $h_1 = IAD$ | $h_1' = h(h_1)$ | $AD_1 = h(IAD)$ |
| $BD_2$ | $h_2 = h(IAD \| BD_2)$ | $h_2' = h(h_2)$ | $AD_2 = h_2'$ |
| $BD_3$ | $h_3 = h(h_2 \| BD_3)$ | $h_3' = h(h_3)$ | $AD_3 = h_3'$ |
| $BD_4$ | $h_4 = h(h_3 \| BD_4)$ | $h_4' = h(h_4)$ | $AD_4 = h_4'$ |
| ⋮ | ⋮ | ⋮ | ⋮ |
| $BD_n$ | $h_n = h(h_{n-1} \| BD_n)$ | $h_n' = h(h_n)$ | $AD_n = h_n'$ |

FIG. 5

$IAD = Sign_{sk}(BD_1)$

| BLOCK DATA ($BD_n$) | FIRST HASH VALUE($h_n$) | INTEGRITY VERIFICATION DATA($AD_n$) |
|---|---|---|
| $BD_1$ | $h_1 = IAD$ | $AD_1 = h(IAD)$ |
| $BD_2$ | $h_2 = h(IAD \| BD_2)$ | $AD_2 = h_2$ |
| $BD_3$ | $h_3 = h(h_2 \| BD_3)$ | $AD_3 = h_3$ |
| $BD_4$ | $h_4 = h(h_3 \| BD_4)$ | $AD_4 = h_4$ |
| ⋮ | ⋮ | ⋮ |
| $BD_n$ | $h_n = h(h_{n-1} \| BD_n)$ | $AD_n = h_n$ |

FIG. 6

APPARATUS AND METHOD FOR GUARANTEEING INTEGRITY OF REAL-TIME VEHICLE DATA AND VEHICLE BLACK BOX SYSTEM USING THE SAME

CROSS-REFERENCE TO RELATED APPLICATIONS

This application claims priority under 35 U.S.C. §119 to Korean Patent Application No. 10-2009-0081278, filed on Aug. 31, 2009, in the Korean Intellectual Property Office, the disclosure of which is incorporated herein by reference in its entirety.

TECHNICAL FIELD

The following disclosure relates to a vehicle black box technique, and in particular, to an apparatus and method for guaranteeing integrity of vehicle data, which guarantees the integrity of vehicle data stored in a black box in real time and supports non-repudiation and error recovery functions, and a vehicle black box system using the same.

BACKGROUND

Originally, a black box was known as a flight data recorder (FDR) or an airborne video recorder (AVR). The black box is used for recording altitude and speed of a flying flight, an operation status, sound in a control room, communications with a control tower or the like for the purpose of inquiring the cause of a flight accident and reconstructing the circumstances of the accident.

However, as the vehicle distribution rate is greatly increasing and the vehicle accident rate rapidly increasing accordingly, the interest on and research and development of vehicle black boxes (or event data recorder) tend to greatly increase.

In fact, annual sales of vehicle black boxes in the market were about 66,000 (about 12 billion won) in 2008, and the annual sales are expected to be about 100,000 (about 20 billion won) this year, namely in 2009. In addition, in the Republic of Korea, the Ministry of Construction and Transportation, the Agency for Technology and Standards, and the Association of Telematics are preparing standards for vehicle black boxes, and the bill compelling to mount a vehicle black box is prospected to be legislated in 2011.

This tendency appears globally. For example, in USA, the Department of Transportation (DOT) has announced standards for black boxes in 2004, the National Highway Traffic Safety Administration (NHTSA) has announced recommendations suggesting importing light-weight vehicles to mount vehicle black boxes from September 2008, and the Society of Automotive Engineers (SAE) and the Institute of Electrical and Electronics Engineers (IEEE) have announced standards for vehicle black boxes. In addition, in case of Europe, the United Nations Economic Commission for Europe (UNECE) is progressing to enact vehicle black box standardization in the mutual export/import standards which are compulsive provisions, and the European Union (EU) has decided the bill demanding the mounting of a black box to every vehicle in the EU member nations from 2009. In addition, in the case of Japan, it has been obligated from 2008 to mount a black box to some kinds of vehicles, and in the case of China, it has been obligated from 2008 to mount a digital running data recorder to every vehicle.

Along such global tendency, the interest on the security problem of the data stored in a black box is also increasing. If the data stored in the black box can be easily faked or falsified, the data reliability is deteriorated due to the concerns of data distortion, and the data may not be recognized as probative evidence. In this case, the basic purpose of the black box technique cannot be accomplished.

However, an existing vehicle black box technique is focused on collecting and storing sensing data in or out of a vehicle or reconstructing an accident circumstance through the data stored in the black box. In other words, the existing technique has a problem in that it is very weak against faking or falsification of black box data by an attacker.

In particular, considering that the vehicle data to be stored in the black box are collected and stored in real time, the technique of guaranteeing data integrity in real time is demanded in order to prevent the vehicle data from being faked or falsified. However, the existing technique does not suggest a solution for guaranteeing integrity of vehicle data in real time.

Further, the existing technique has a problem in that it does not provide non-repudiation and error recovery functions for the data stored in the black box.

SUMMARY

The present invention is directed to providing an apparatus for guaranteeing integrity of vehicle data which may guarantee integrity of vehicle data stored in a black box in real time and support non-repudiation and error recovery functions.

The present invention is also directed to providing a method for guaranteeing integrity of vehicle data which may guarantee integrity of vehicle data stored in a black box in real time and support non-repudiation and error recovery functions.

The present invention is also directed to providing a vehicle black box system using the apparatus and method for guaranteeing integrity of vehicle data.

In one general aspect, an apparatus for guaranteeing integrity of real-time vehicle data includes: a data blocking unit for dividing input data streams about sensing information of a vehicle into block data of a predetermined size; an initial authentication data (IAD) generating unit for generating IAD by signing initial block data of the input data streams by a signing key; a first hashing unit for generating a first hash value of each of the divided block data in order, the first hashing unit generating a first hash value of the present block data by concatenating and hashing a value of the present block data and a first hash value of a previous block data; and a second hashing unit for generating a second hash value by hashing the first hash value of the present block data and outputting the second hash value as integrity verification data of the present block data, wherein the first hashing unit uses the IAD value as the first hash value of the initial block data.

In one embodiment, the IAD generating unit may generate the IAD by using a signing key issued from a third trust party.

In one embodiment, the IAD generating unit may be implemented as a smart card which includes the signing key and guarantees the security of the signing key.

In one embodiment, the IAD generating unit may include a memory unit storing the signing key and the generated IAD.

In one embodiment, the apparatus for guaranteeing integrity of real-time vehicle data may further include a first storing unit for storing the first hash value generated by the first hashing unit, and the first hashing unit may generate a first hash value of the present block data by using a first hash value of a previous block data, stored in the first storing unit.

In one embodiment, the first storing unit may store the IAD value as the first hash value of the initial block data.

In one embodiment, in case of storing the first hash value of the present block data, the first storing unit may delete the first hash value of the previous block data.

In one embodiment, the apparatus for guaranteeing integrity of real-time vehicle data may further include a second storing unit for storing integrity verification data of each block data, output by the second hashing unit.

In another aspect, a method for guaranteeing integrity of real-time vehicle data, in which a vehicle black box collecting and storing vehicle data of sensing information of a vehicle guarantees integrity of the vehicle data in real time, includes: a blocking data step for dividing input data streams about the sensing information of a vehicle into block data of a predetermined size; an initial authentication data (IAD) generating step for generating IAD by signing initial block data of the input data streams by a signing key; a first hashing step for generating a first hash value of each of the divided block data in order, wherein a value of the present block data and a first hash value of a previous block data are concatenated and hashed to generate a first hash value of the present block data; and a second hashing step for generating a second hash value by hashing the first hash value of the present block data and outputting the second hash value as integrity verification data of the present block data, wherein, in the first hashing step, the IAD value is used as the first hash value of the initial block data.

In another aspect, a vehicle black box system for collecting and storing vehicle data of sensing information of a vehicle includes: a blocking data unit for dividing input data streams about the sensing information of a vehicle into block data of a predetermined size; an initial authentication data (IAD) generating unit for generating IAD by signing initial block data of the input data streams by a signing key; a first hashing unit for generating a first hash value of each of the divided block data in order, wherein a value of the present block data and a first hash value of a previous block data are concatenated and hashed to generate a first hash value of the present block data; and a second hashing unit for generating a second hash value by hashing the first hash value of the present block data and outputting the second hash value as integrity verification data of the present block data, wherein the first hashing unit uses the IAD value as the first hash value of the initial block data.

In one embodiment, the IAD generating unit may be implemented as a smart card which includes a signing key issued from a third trust party and guarantees the security of the signing key.

In one embodiment, the vehicle black box system may further include a data storage for storing integrity verification data of each block data, output by the second hashing unit.

In one embodiment, the data storage may further store the block data corresponding to the integrity verification data.

The present invention provides the advantage of guaranteeing the integrity of vehicle data stored in a black box in real time by forming input data streams as block data and performing a signature using a signing key and nested hashing.

In addition, since each vehicle black box includes a reliable unique signing key, the present invention provides the advantages of supporting a non-repudiation function.

Furthermore, the present invention provides the advantages of supporting an error recovery function through a unique algorithm for generating integrity verification data even when an error occurs from the vehicle data.

DETAILED DESCRIPTION OF EMBODIMENTS

An apparatus for guaranteeing integrity of real-time vehicle data according to the present invention includes: a data blocking unit for dividing input data streams about sensing information of a vehicle into block data of a predetermined size; an initial authentication data (IAD) generating unit for generating IAD by signing initial block data of the input data streams by a signing key; a first hashing unit for generating a first hash value of each of the divided block data in order, the first hashing unit generating a first hash value of the present block data by concatenating and hashing a value of the present block data and a first hash value of a previous block data; and a second hashing unit for generating a second hash value by hashing the first hash value of the present block data and outputting the second hash value as integrity verification data of the present block data, wherein the first hashing unit uses the IAD value as the first hash value of the initial block data.

A method for guaranteeing integrity of real-time vehicle data includes: a blocking data step for dividing input data streams about the sensing information of a vehicle into block data of a predetermined size; an IAD generating step for generating IAD by signing initial block data of the input data streams by a signing key; a first hashing step for generating a first hash value of each of the divided block data in order, wherein a value of the present block data and a first hash value of a previous block data are concatenated and hashed to generate a first hash value of the present block data; and a second hashing step for generating a second hash value by hashing the first hash value of the present block data and outputting the second hash value as integrity verification data of the present block data, wherein, in the first hashing step, the IAD value is used as the first hash value of the initial block data.

Hereinafter, a preferred embodiment of the present invention will be described in detail with reference to the accompanying drawings in order to clearly show a solution to the technical subject of the present invention. However, when the present invention is described, if any description makes the essence of the present invention unclear, the description will be excluded. In addition, the terms used herein are defined in consideration of functions in the present invention, and they can be changed according to the intent or custom of a user or operator. Therefore, the terms should be defined based on the disclosure of the entire specification.

Figure 1:
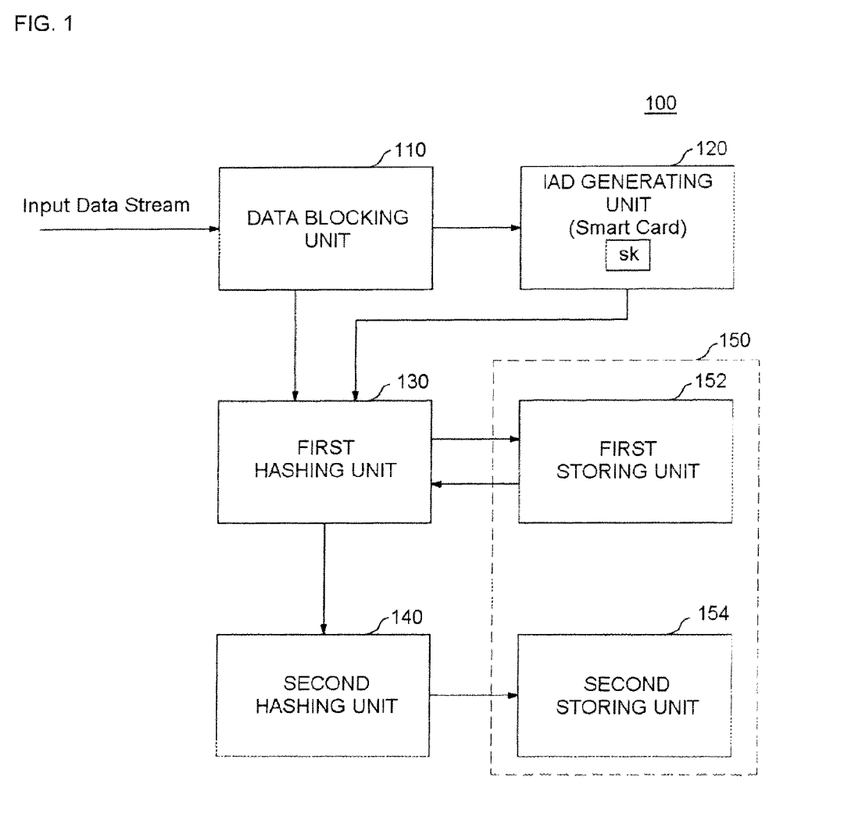
FIG. 1 is a block diagram showing an apparatus for guaranteeing integrity of real-time vehicle data according to an embodiment of the present invention.

FIG. 1 is a block diagram showing an apparatus for guaranteeing integrity of real-time vehicle data according to an embodiment of the present invention.

Figure 2:
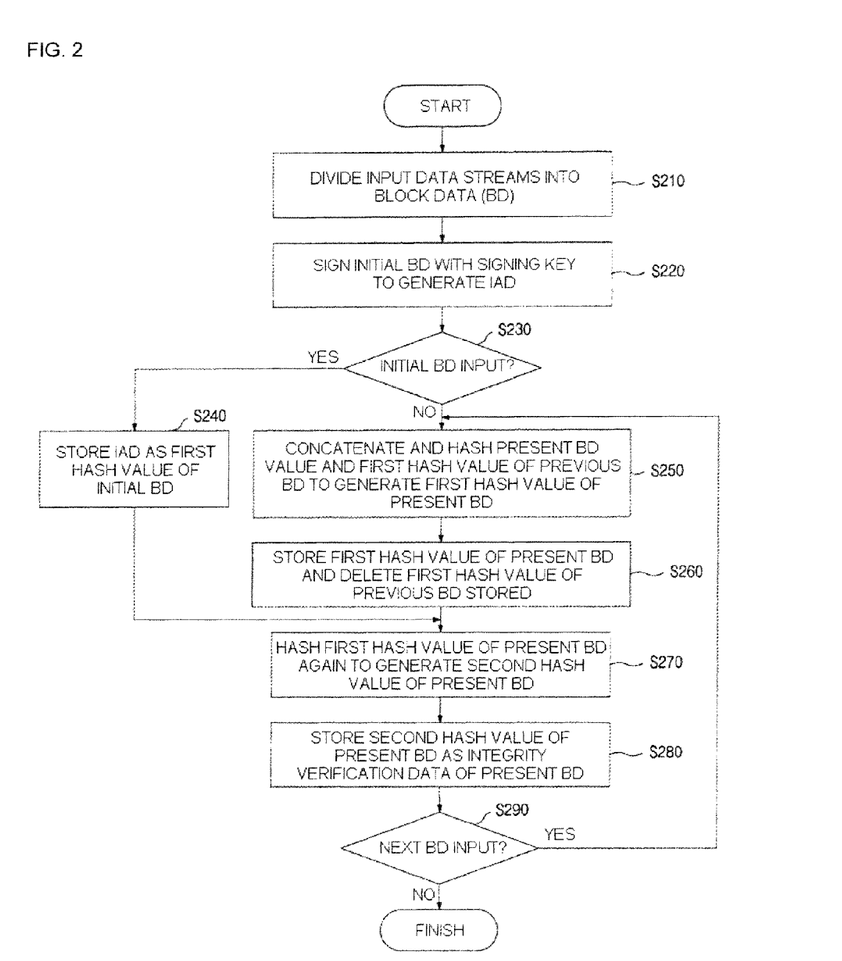
FIG. 2 is a flowchart for illustrating a method for guaranteeing integrity of real-time vehicle data according to an embodiment of the present invention.

FIG. 2 is a flowchart for illustrating a method for guaranteeing integrity of real-time vehicle data according to an embodiment of the present invention.

Referring to FIGS. 1 and 2, the apparatus for guaranteeing integrity of real-time vehicle data 100 includes a data blocking unit 110, an IAD generating unit 120, a first hashing unit 130 and a second hashing unit 140, and may further include a data storage 150.

First, the data blocking unit 110 divides input data streams about the sensing information of a vehicle into block data of a predetermined size (S210). This is originated from the technical configuration directed to processing the input data streams about the sensing information of a vehicle.

After that, the IAD generating unit 120 signs initial block data of the input data streams by a signing key (sk) to generate initial authentication data (IAD) (S220). In one embodiment, the IAD generating unit 120 may be implemented as a smart card which includes the signing key (sk) and ensures the security of the signing key (sk). A semiconductor chip where an IC memory and a central processing unit (CPU) are loaded is embedded in the smart card, and the smart card ensures excellent stability and does not allow faking since it has security functions in coding/decoding, certification of an accessing object, stored data management or the like. At this time, the smart card may be issued from a third trust party (TTP), for example a government agency, when purchasing a black box equipped with the integrity guaranteeing apparatus 100 or registering a vehicle. The signing key (sk) is uniquely allocated to the integrity guaranteeing apparatus 100 or the black box equipped with it, and it may be issued from the third trust party together when the smart card is issued. In one embodiment, the signing key (sk) may be issued from the third trust party by installing a communication module (not shown) at the integrity guaranteeing apparatus 100 or the black box having the same. In addition, the IAD generating unit 120 includes a secure memory unit (for example, an IC memory of the smart card), which stores the issued signing key (sk) and the generated IAD.

After that, the first hashing unit 130 generates a first hash value of each of the divided block data in order, and here a value of present block data and a first hash value of a previous block data are concatenated and hashed to generate a first hash value of the present block data (S230 to S260). For this purpose, the integrity guaranteeing apparatus 100 may further include a first storing unit 152 for storing the first hash value generated by the first hashing unit 130.

It should be noted that, in the case where the initial block data is input, the first hashing unit 130 uses a value of the IAD generated by the IAD generating unit 120 instead of the first hash value of the initial block data. It is because previous block data is not present in the case of the initial block data.

In more detail, in the case where the initial block data is input (S230), the first hashing unit 130 stores the IAD value in the first storing unit 152 as the first hash value of the initial block data (S240). And, in the case where second or later block data is input (S230), the first hashing unit 130 generates the first hash value of the present block data by concatenating and hashing a presently input block data value and a first hash value of the previous block data (S250).

In addition, the first hashing unit 130 stores the first hash value of the present block data in the first storing unit 152, and uses it as a first hash value of the previous block data when generating a first hash value of a next block data. At this time, in the case where the first hash value of present block data is stored, the first storing unit 152 deletes the first hash value of the previous block data, stored in the first storing unit 152 (S260). For example, in the case of a first hash value of second block data is generated or stored in the first storing unit 152, the IAD value which is the previous block data, namely the first hash value of the initial block data, is deleted from the first storing unit 152. In addition, in the case where a first hash value of third block data is generated or stored in the first storing unit 152, the first hash value of the second block data is deleted from the first storing unit 152. Since the memory or data storing space such as the first storing unit 152 may be easily accessed by an attacker, the above process allows important information such as the IAD not to be exposed unnecessary.

After that, the second hashing unit 140 hashes the first hash value of the present block data again to generate a second hash value, and outputs the second hash value as integrity verification data of the present block data (S270). At this time, the integrity guaranteeing apparatus 100 may further include a second storing unit 154 to store integrity verification data of each block data output by the second hashing unit 140 (S280).

In the case where next block data is input (S290), the integrity guaranteeing apparatus 100 repeats the above processes (S250 to S280).

In FIG. 1, the first storing unit 152 and the second storing unit 154 are implemented separately, but it is also possible that a single storing unit 150 is implemented according to an embodiment.

Figure 3:
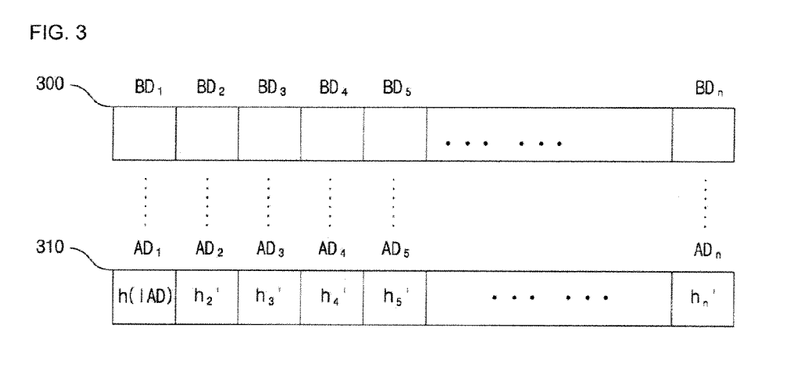
FIG. 3 is a diagram showing block data and integrity verification data generated according to an embodiment of the present invention.

FIG. 3 shows block data and integrity verification data generated according to an embodiment of the present invention.

As shown in FIG. 3, in the present invention, the input data streams about the sensing information of a vehicle 300 is divided into block data ($BD_n$) of a predetermined size, and additional data ($AD_n$) 310, namely integrity verification data ($AD_n$) corresponding to each of the divided block data ($BD_n$) is generated.

Figure 4:
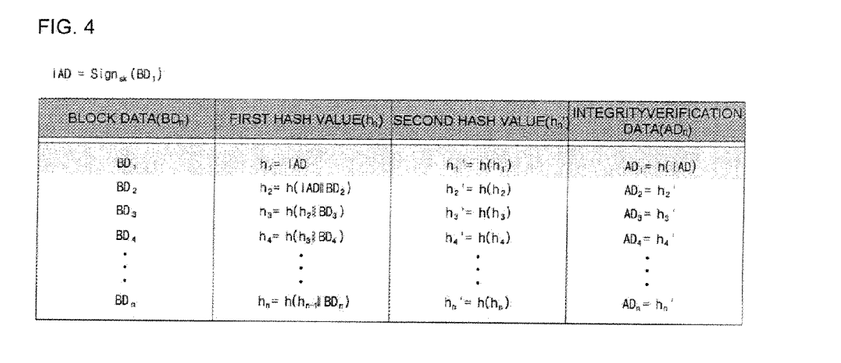
FIG. 4 is a diagram showing operation values generated according to an embodiment of the present invention.

FIG. 4 is a diagram showing operation values generated according to an embodiment of the present invention.

As shown in FIG. 4, the integrity verification data ($AD_n$) generated according to an embodiment of the present invention is generated as follows:

1. Initial block data ($BD_1$) enters by the input of the IAD generating unit (for example, a smart card) 120 and is signed by the signing key (sk) and output. The signature value $\text{Sign}_{sk}$ ($BD_1$) is defined as IAD.

2. The IAD is stored in a secure memory of the IAD generating unit 120.

3. The IAD value is used as the first hash value ($h_1$) of the $BD_1$, and the second hash value ($h_1'$) of the $BD_1$, namely h (IAD) obtained by hashing the IAD, is stored as the integrity verification data ($AD_1$) of the $BD_1$.

4. (IAD∥$BD_2$) obtained by concatenating and hashing the IAD and $BD_2$ is stored as the first hash value ($h_2$) of the second block data ($BD_2$).

5. The IAD is deleted from the storing unit if the $h_2$ is generated.

6. h ($h_2$) obtained by hashing the $h_2$ is used as the second hash value ($h_2'$) of the $BD_2$.

7. In other words, the $h_2'$ is stored as the integrity verification data ($AD_2$) of the $BD_2$.

8. h ($h_2$∥$BD_3$) obtained by concatenating and hashing the $h_2$ and $BD_3$ is stored as the first hash value ($h_3$) of the third block data ($BD_3$).

9. The $h_2$ is deleted from the storing unit if the $h_3$ is generated.

10. h ($h_3$) obtained by hashing the $h_3$ is stored as the second hash value ($h_3'$) of the $BD_3$.

11. In other words, the $h_3'$ is stored as the integrity verification data ($AD_3$) of the $BD_3$.

12. The integrity verification data ($AD_n$) of block data ($BD_n$) is successively generated and stored through the processes 8 to 11.

In the present invention, hashing is performed twice to generate each integrity verification data ($AD_n$), in order to provide the more perfect and efficient real-time data integrity security technique.

Figure 5:
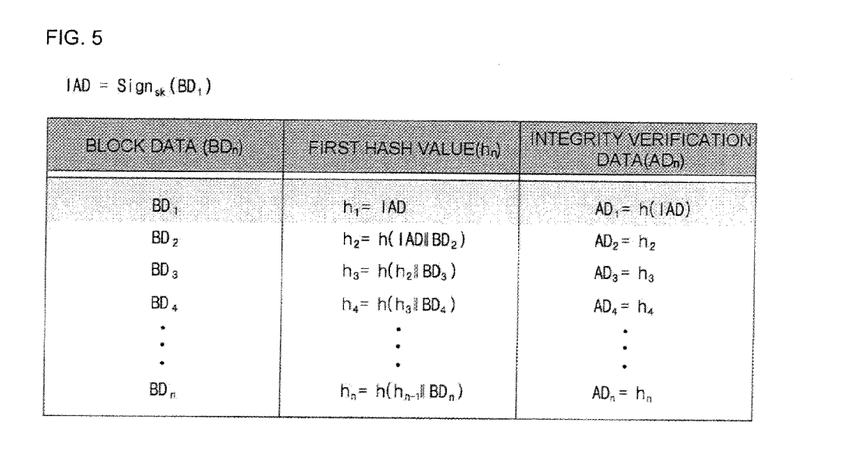
FIG. 5 is a diagram showing operation values in a case where hashing is performed once to generate integrity verification data.

FIG. 5 is a diagram showing operation values in a case where hashing is performed once to generate integrity verification data.

As shown in FIG. 5, in a case where integrity verification data ($AD_n$) is generated just one hashing, for example in a case where $h_2$ is stored as the integrity verification data ($AD_2$) of the second block data ($BD_2$), an attacker cannot generate data till the $AD_2$, but an attacker can generate data from the integrity verification data ($AD_3$) of the third block data ($BD_3$) since the first hash value ($h_{n-1}$) of the previous block data, for example $h_2$, is exposed.

Meanwhile, if the IAD is concatenated to block data ($BD_n$) after the $BD_2$, data integrity may be secured by just one hashing logically. However, in this case, the IAD is exposed continuously on the memory of the storing unit, and therefore an attacker may fake or falsify $AD_n$ data.

Therefore, in the present invention, hashing is performed twice to generate each integrity verification data ($AD_n$) in order to solve the above problems, thereby ensuring data integrity. Here, it should be noted that, in an actual implementation, a hash function allows rapid operation and gives substantially no influence on the operating performance.

Figure 6:
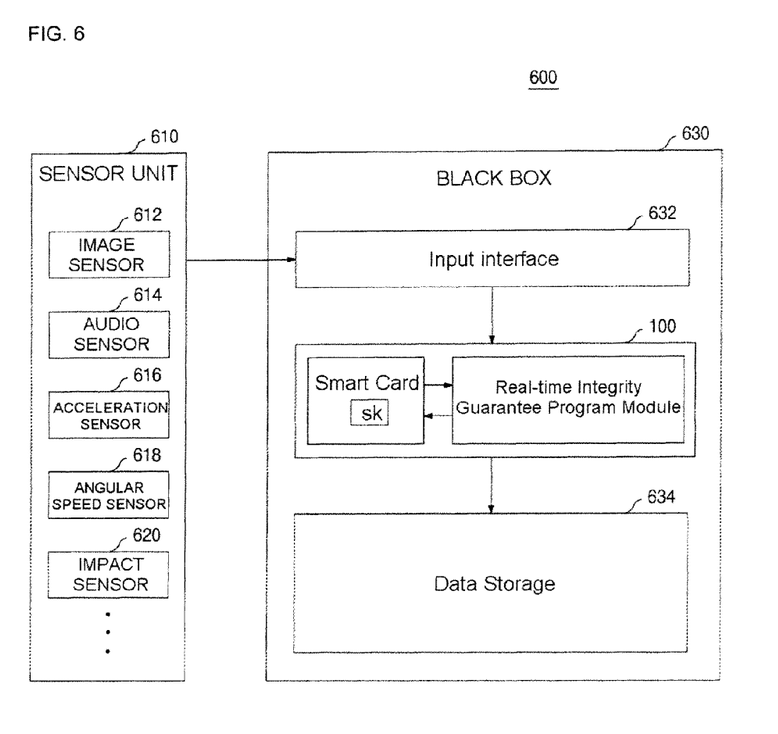
FIG. 6 is a block diagram showing a vehicle black box system according to an embodiment of the present invention.

FIG. 6 is a block diagram showing a vehicle black box system according to an embodiment of the present invention.

As shown in FIG. 6, the vehicle black box system 600 may include a sensor unit 610 for sensing various kinds of information in or out of a vehicle, and a black box 630 for collecting and storing the information sensed by the sensor unit 610.

The sensor unit 610 may include various sensors for sensing various kinds of information in or out of a vehicle. For example, the sensor unit 610 may include an image sensor 612 for photographing an image around a vehicle, an audio sensor 614 for recording sounds in or out of the vehicle, an acceleration sensor 616 and an angular speed sensor 618 for sensing the change of a running speed or rotation of the vehicle, and an impact sensor 620 for sensing the collision of the vehicle.

The black box 630 may include an input interface 632 for converting the sensing signal detected by the sensor unit 610 into digital data streams, an integrity guaranteeing unit 100 guaranteeing integrity of input data in real time, and a data storage 634 for storing data.

Detailed configurations and operations of the integrity guaranteeing unit 100 refer to the above description about the apparatus for guaranteeing integrity of real-time vehicle data 100.

As described above, the IAD generating unit 120 of the integrity guaranteeing unit 100 may be implemented as a smart card which includes a signing key (sk) issued from a third trust party (TTP) and ensures the security of the signing key (sk). In this case, the signature value IAD generated by the smart card may be obtained only in the integrity guaranteeing unit 100, and even a vehicle owner is not able to obtain the signature value in another way. As a result, only the third trust party (TTP) issuing the signing key (sk) possesses a public key (pk) for signature verification corresponding to the signing key (sk), and only the third trust party (TTP) may perform data integrity verification. For example, the third trust party (TTP) may verify the integrity of generated data by performing reading the IAD value from the smart card, performing signature verification with the public key (pk) corresponding to the signing key (sk), and then, if the signature verification is successful, hashing the block data ($BD_n$) in the same order as the generating process of the integrity verification data ($AD_n$) to compare whether values ($AD_n'$) generated by the hashing are identical to values of the integrity verification data ($AD_n$).

The data storage 634 stores the block data ($BD_n$) as original data corresponding to the integrity verification data ($AD_n$). In one embodiment, the first storing unit 152, the second storing unit 154, or both of the first and second storing units 152 and 154 of the integrity guaranteeing unit 100 may be integrated into the data storage 634 and implemented as a single storing unit. In addition, in on embodiment, in consideration of the data storage 634, the amount of data stored in the data storage 634 may be restricted in a first-in first-out method. In other words, newly input data may be stored while deleting old stored data. At this time, in the case where the sensing information detected by the sensor unit 610 means an emergent situation such as accident, robbery, malfunction or the like, the data storage 634 may be implemented to store data at the corresponding situation regardless of the storing time.

In addition, in one embodiment, the integrity guaranteeing unit 100 may be implemented with a system-on-chip technique on a black box electronic control unit (ECU, not shown) controlling the vehicle black box so that the black box ECU guarantees the integrity of vehicle data stored in the vehicle black box. When the present invention is implemented with a single microprocessor chip, various systems may reduce their sizes, and assembling processes may be simplified. Therefore, a production cost may be reduced.

In addition, the present invention may be implemented as computer-readable program codes on a computer-readable recording medium according to an embodiment. When the present invention is executed through software, components of the present invention will be code segments executing necessary works. In addition, the program codes or segments may be stored in a processor-readable medium of a computer or transmitted as computer data signals combined with carriers through a transmission medium or a communication network.

The computer-readable recording medium includes all kinds of recording devices storing data readable by computer systems. For example, the computer-readable recording medium may include ROM, RAM, CD-ROM, magnetic tapes, floppy disk, photo data storage or the like. In addition, the computer-readable recording medium may be distributed in a computer system connected through a network so that computer-readable codes are stored and executed in a distributed way.

Hereinafter, distinguishable effects of the present invention will be analyzed.

The present invention guarantees real-time integrity of data stored in the vehicle black box. In other words, in FIG. 4, since the $AD_1$ is a value obtained by hashing a signature value IAD made by using the signing key (sk), an attacker is not aware of the signing key (sk) and the IAD stored in the smart card and therefore is not able to generate the $AD_1$. The IAD value may be read by only the third trust party (TTP). In addition, the IAD may not be generated, the $h_2$ and $h_2'$ may not be generated, which means that $AD_2$ may also not be generated. In addition, since the $h_2$ may not be generated, $h_3$ and $h_3'$ may not be generated, which means that $AD_3$ may also not be generated. In the some principle, an attacker may not generate $AD_n$ afterwards. In addition, since $h_n$ which is a pre-image value of $h_n'$ may not be known due to the feature of the hash function, it is impossible to fake an intermediate value.

In addition, the present invention supports a non-repudiation function since the present invention allows each black box system to have a unique signing key.

In addition, the present invention supports an error recovery function even when an error occurs due to an external impact, an electric signal error, radio interference or the like, after the integrity verification data ($AD_n$) is stored. In other words, even when an error occurs at the $AD_{n-1}$ value so that the integrity of $AD_n$ is not verified, since the IAD value may be known, the integrity of all of remaining blocks may be verified.

Further, the present invention supports partial error recovery if the input data streams relate to moving picture data, even when an error occurs after the block data ($BD_n$) is stored. In other words, in order to prepare the case where the integrity of subsequent block data is unable to be verified when an error occurs at specific block data ($BD_n$), every intra-frame (I-frame) of the moving picture data is signed. The signature values generated as above are stored separate from the integrity verification data ($AD_n$). Since the I-frame may be decoded and converted into an image afterwards, even when an error occurs at the moving picture data, the integrity may be verified for a still image at every second.

As described above, the present invention gives advantages of guaranteeing integrity of vehicle data stored in a black box in real time and supporting non-repudiation and error recovery functions.

The present invention may be implemented as a module of a vehicle black box.

While the present invention has been described with respect to the specific embodiments, it will be apparent to those skilled in the art that various changes and modifications may be made without departing from the spirit and scope of the invention. Therefore, the disclosed embodiments should be considered not limitative but illustrative. In other words, the scope of the present invention is defined in the following claims, and all differences within the equivalent range should be interpreted as being included in the present invention.

What is claimed is:

1. An apparatus for guaranteeing integrity of real-time vehicle data, comprising:
    a non-transitory computer-readable storage medium having encoded thereon instructions for guaranteeing integrity of real-time vehicle data; and
    a processor that executes the instructions, wherein the processor:
        divides input data streams about sensing information for a vehicle into divided block data of a predetermined size;
        generates initial authentication data (IAD) by signing an initial block data of the input data streams by a signing key;
        generates for each of the divided block data in order, a first hash value by:
            concatenating and hashing a value of the present block data and a previous block data's first hash value; and
        generating for each of the divided block data in order, a second hash value by:
            hashing the present block data's first hash value and outputting the present block data's second hash value as integrity verification data of the present block data,
    wherein the IAD is used as the initial block data's first hash value.

2. The apparatus for guaranteeing integrity of real-time vehicle data according to claim 1, wherein the signing key is issued from a trusted third party.

3. The apparatus for guaranteeing integrity of real-time vehicle data according to claim 2, wherein instructions for generating the IAD are stored on a smart card that includes the signing key.

4. The apparatus for guaranteeing integrity of real-time vehicle data according to claim 3, wherein the smart card includes a memory unit storing the signing key and the generated IAD.

5. The apparatus for guaranteeing integrity of real-time vehicle data according to claim 1, further comprising a first storing unit for storing first hash values generated by the processor, and
    wherein the processor generates the present block data's first hash value by using the previous block data's first hash value, stored in the first storing unit.

6. The apparatus for guaranteeing integrity of real-time vehicle data according to claim 5, wherein the first storing unit stores the IAD as the initial block data's first hash value.

7. The apparatus for guaranteeing integrity of real-time vehicle data according to claim 6, wherein, in case of storing the present block data's first hash value, the processor deletes the previous block data's first hash value.

8. The apparatus for guaranteeing integrity of real-time vehicle data according to claim 5, further comprising a second storing unit for storing integrity verification data of each block data, output by the second hashing unit.

9. A method for guaranteeing integrity of real-time vehicle data, in which a vehicle black box collecting and storing vehicle data of sensing information of a vehicle guarantees integrity of the vehicle data in real time, the method comprising:
    a blocking data step of dividing input data streams about the sensing information of the vehicle into divided block data of a predetermined size;
    an initial authentication data (IAD) generating step of generating the IAD by signing an initial block data of the input data streams by a signing key;
    first hashing steps of generating a first hash value of each of the divided block data in order, comprising:
        concatenating and hashing a value of a present block data and a previous block data's first hash value to generate a present block data's first hash value; and
    second hashing steps of generating a second hash value of each of the divided block data in order, comprising:
        hashing the present block data's first hash value of the and outputting the present block data's second hash value as integrity verification data of the present block data,
    wherein the IAD value is used as the first hash value of the initial block data.

10. The method for guaranteeing integrity of real-time vehicle data according to claim 9, wherein the signing key is issued from a trusted third party.

11. The method for guaranteeing integrity of real-time vehicle data according to claim 9, further comprising:
    a first storing step of storing the first hash value generated by the first hashing steps,
    wherein, in the first hashing steps, the present block data's first hash value is generated by using the previous block data's stored first hash value.

12. The method for guaranteeing integrity of real-time vehicle data according to claim 11, wherein, in the first storing step, the IAD value is stored as the initial block data's first hash value.

13. The method for guaranteeing integrity of real-time vehicle data according to claim 12, wherein, in the first storing step, in the case where the present block data's first hash value is stored, the previous block data's first hash value is deleted.

14. The method for guaranteeing integrity of real-time vehicle data according to claim 11, further comprising:
   a second storing step of storing the integrity verification data of each block data, output by the second hashing steps.

15. A non-transitory computer readable recording medium comprising instructions for execution by a processor, wherein the processor, when executing the instructions, completes the following steps:
   a blocking data step of dividing input data streams about the sensing information of the vehicle into divided block data of a predetermined size;
   an initial authentication data (IAD) generating step of generating the IAD by signing an initial block data of the input data streams by a signing key;
   first hashing steps of generating a first hash value of each of the divided block data in order, comprising:
   concatenating and hashing a value of a present block data and a previous block data's first hash value to generate a present block data's first hash value; and
   second hashing steps of generating a second hash value of each of the divided block data in order, comprising:
   hashing the present block data's first hash value and outputting the present block data's second hash value as integrity verification data of the present block data,
   wherein the IAD value is used as the first hash value of the initial block data.

* * * * *